(12) United States Patent
Pirri et al.

(10) Patent No.: US 8,378,013 B2
(45) Date of Patent: Feb. 19, 2013

(54) HYBRID IMPACT MODIFIERS AND METHOD FOR PREPARING THE SAME

(75) Inventors: Rosangela Pirri, Montardon (FR); Philippe Hajji, Grigny (FR)

(73) Assignee: Arkema France, Colombes (FR)

( * ) Notice: Subject to any disclaimer, the term of this patent is extended or adjusted under 35 U.S.C. 154(b) by 734 days.

(21) Appl. No.: 12/279,225

(22) PCT Filed: Feb. 9, 2007

(86) PCT No.: PCT/EP2007/051295
§ 371 (c)(1),
(2), (4) Date: Aug. 13, 2008

(87) PCT Pub. No.: WO2007/093565
PCT Pub. Date: Aug. 23, 2007

(65) Prior Publication Data
US 2009/0018248 A1    Jan. 15, 2009

Related U.S. Application Data

(60) Provisional application No. 60/781,980, filed on Mar. 14, 2006.

(30) Foreign Application Priority Data
Feb. 14, 2006   (EP) ..................... 06290251

(51) Int. Cl.
*C08K 3/26* (2006.01)
*C08K 3/34* (2006.01)

(52) U.S. Cl. ........................ 524/425; 524/445

(58) Field of Classification Search ............ 524/425
See application file for complete search history.

(56) References Cited

U.S. PATENT DOCUMENTS

| | | | |
|---|---|---|---|
| 3,287,443 A | 11/1966 | Saito | |
| 3,657,391 A | 4/1972 | Curfman | |
| 3,808,180 A | 4/1974 | Owens | |
| 3,985,703 A | 10/1976 | Ferry | |
| 3,985,704 A | 10/1976 | Jones | |
| 4,096,202 A | 6/1978 | Farnham | |
| 4,180,494 A | 12/1979 | Fromuth | |
| 4,260,693 A | 4/1981 | Liu | |
| 4,278,576 A * | 7/1981 | Goldman | 523/201 |
| 4,299,928 A | 11/1981 | Witman | |
| 4,301,060 A * | 11/1981 | Underwood et al. | 524/493 |
| 5,773,520 A | 6/1998 | Bertelo | |
| 2002/0072552 A1 | 6/2002 | Wills | |
| 2004/0110900 A1 | 6/2004 | Lau | |
| 2006/0069206 A1 | 3/2006 | Cruz | |

FOREIGN PATENT DOCUMENTS

| | | |
|---|---|---|
| EP | 0263714 | 4/1988 |
| JP | 59057913 | 4/1984 |
| WO | 2007093565 | 8/2007 |

OTHER PUBLICATIONS

Reade, Mohs' Hardness of Abrasives, Jan. 11, 2006.*
International Search Report for PCT/EP2007/051295 filed Feb. 9, 2007, mailed May 29, 2007.

* cited by examiner

*Primary Examiner* — Hui Chin
(74) *Attorney, Agent, or Firm* — Lynn B. Morreale

(57) ABSTRACT

The present invention relates to hybrid impact modifiers prepared by: either spray drying, coagulation, freeze coagulation or other known recovery methods of a mixture of a latex or slurry of standard impact modifiers and a slurry of a mineral filler, or simultaneous drying (by spray-drying, coagulation other known recovery possible methods) of (i) a latex or slurry of standard impact modifiers and of (ii) a slurry of a mineral filler, further to the coagulation or freeze coagulation, if any, there is a filtration and drying step to recover these hybrid impact modifiers as a powder. The present invention also relates to the use of said hybrid impact modifiers in thermoplastic polymers, and a thermoplastic polymer containing said hybrid impact modifiers. The hybrid impact modifiers may exhibit improved powder properties (flowability, lumping/caking resistance, segregation between the organic and the mineral parts) and better dispersion homogeneities.

18 Claims, 2 Drawing Sheets

HYBRID IMPACT MODIFIERS AND METHOD FOR PREPARING THE SAME

CROSS-REFERENCE TO :RELATED APPLICATIONS

This application claims the benefit of the filing date of U.S. Provisional Application Ser. No. 60/781,980 filed Mar. 14, 2006. This application also claims priority to EP application No. 06290251.5, filed Feb. 14, 2006, both of which are hereby incorporated by reference in their entireties.

FIELD OF THE INVENTION

The present invention relates to hybrid impact modifiers (by way of example for PVC) prepared by spray drying, coagulation, freeze coagulation or other known recovery methods. More precisely it relates to hybrid impact modifiers prepared by:
- either spray drying, coagulation, freeze coagulation or other known recovery methods of a mixture of a latex or slurry of standard impact modifiers and a slurry of a mineral filler,
- either simultaneous spray drying or coagulation of (i) a latex or slurry of standard impact modifiers and of (ii) a slurry of a mineral filler.

These hybrid impact modifiers are recovered as a powder, said powder is then introduced in a thermoplastic matrix to be impact modified. This powder is mixed with this thermoplastic matrix either in the molten state or dry blended with the powder of thermoplastic matrix. Optionally, other additives, can be introduced at the same time as the hybrid modifier powder.

THE PRIOR ART AND THE TECHNICAL PROBLEM

Impact strengthening of rigid polyvinyl chloride (PVC) is mainly achieved by introducing polymeric impact modifiers additives such as methacrylate-butadiene-styrene copolymers (MBS), acrylonitrile-butadiene-styrene copolymers (ABS) or Acrylic core/shell polymers (AIM) as well as CPE (chlorinated polyethylene). Those modifiers are generally synthesized in water phase through emulsion or suspension polymerisation processes or chlorination of HDPE in slurry state for CPE preparation. Whatever the impact modifier, before recovering it as a powder (e.g. spray-drying, coagulation), the polymeric modifier is dispersed into a water phase (latex, suspension or slurry).

Some mineral filler such as silica or calcium carbonate, with primary particle sizes within the micrometer or nanometer ranges are often added to the abovementioned impact modifiers, mainly to improve their powder properties (flowability, lumping/caking resistance . . . ) allowing bulk delivery. In that case, the mineral filler is added as a powder into the powder of impact modifier, during or after the recovery process of the impact modifier.

U.S. Pat. No. 4,278,576 relates to isolation and improvement of impact modifier polymer powders and to blends of thermoplastic matrix polymers with such impact modifier polymer powders. The isolation method can be spray drying, coagulation, grinding, or other. As described in this prior art about 0.5 to 50% by weight, preferably 0.5 to 25% by weight, based on impact modifier polymer and stearate coated calcium carbonate, of stearate coated calcium carbonate having an average particle size of about 0.04 to 1 micron is introduced after the formation of the impact modifier polymer but before or during isolation as powders. That is to say, the stearate coated calcium carbonate is added either during the polymerization process to form the polymer, or after the polymer is formed but before it is isolated as a powder. When the isolation method is grinding, the stearate coated calcium carbonate can be added at a level over 50% and thereafter partially removed by sieving to reduce its level in the final product to 50% or below. The most preferable stearate coated calcium carbonate is one currently sold by Imperial Chemical Industries under the trademark Winnofil S which has a particle size of about 0.075 microns and is non-aggregated. The "matrix" polymers, can be polyvinyl chloride, nylon, polymethyl methacrylate, polystyrene, thermoplastic polyesters such as polyethylene terephthalate, polybutylene terephthalate, polycyclohexanedimethanol terephthalate, and polyolefins such as polyethylene, polypropylene, and any other matrix polymer which can be improved by an impact modifier. The impact modifiers polymers which are isolated in accordance with the process of U.S. Pat. No. 4,278,576, and are part of the composition, are methacrylate-butadiene-styrene graft polymers (MBS), for example those described in U.S. Pat. No. 3,985,704; acrylic core/shell polymers (AIM), for example those described in U.S. Pat. No. 3,985,703, or analogs of these wherein the rubber content may be from 60 to 100% of the total polymeric material.

Examples I-III of U.S. Pat. No. 4,278,576 describe that using standard emulsion polymerization techniques an acrylic core/shell polymer was prepared using 79.2 parts of butyl acrylate, 0.4 parts of butylene glycol diacrylate, and 0.4 parts of diallyl maleate as the rubbery core followed by 20 parts of methyl methacrylate as the second stage. The emulsion was spray dried in the presence of air as the drying medium. To improve spray drying and powder flow properties, particulate additives (such as stearate coated calcium carbonate) were fed into the inlet air stream.

Unfortunately, such mineral introduction route does not protect from certains drawbacks as dispersion and concentration heterogeneities as well as segregation issues. This is more particularly true when talking about amount of mineral above 2 or 3% with respect to the organic impact modifier content.

The object of the present invention is to improve dispersion and concentration homogeneities and prevent segregation (specially during transportation or silo transfer).

The way to achieve those improvements is to mix polymeric modifier and mineral filler in water dispersed phases, which means that the modifier dispersion (latex, suspension or slurry) is mixed together with a slurry of the mineral filler. In that case, the mineral part can be calcium carbonate, but also zeolite, hydrotalcite, clay, montmorillonite, perlite and any other type of inorganic material that can be obtained as a slurry. Once the organic/inorganic blend is sufficiently homogeneous, standard recovery processes of abovementioned impact modifiers can be performed (spray-drying, coagulation, freeze coagulation or other known recovery methods). Another route could be to simultaneously dry (by spray-drying, coagulation other known recovery possible methods) the organic water dispersion and mineral slurry, meaning that the 2 different water based products (i.e., organic and mineral) are introduced into the drying chamber (or coagulation equipment) simultaneously by 2 separate nozzles (or entries). Whatever the process, the final product has to be considered as an hybrid impact modifier being either a composite modifier when the original mineral part consists in primary particles with sizes in the micrometer scale, or a nanocomposite modifier when the mineral part consists in primary particles with sizes in the nanometer scale. In fact, the resulting powder material consists in primary grains that contains both organic and inorganic phases, intimately mixed together.

BRIEF DESCRIPTION OF THE INVENTION

The present invention relates to hybrid impact modifiers prepared by
  either spray drying, coagulation, freeze coagulation or other known recovery methods of a mixture of a latex or slurry of standard impact modifiers and a slurry of a mineral filler,
  either simultaneous dry (by spray-drying, coagulation other known recovery possible methods) of (i) a latex or slurry of standard impact modifiers and of (ii) a slurry of a mineral filler,
further to the coagulation or freeze coagulation, if any, there is a filtration and drying step to recover these hybrid impact modifiers as a powder.

The host polymers to be impact modified, can be any thermoplastic. Advantageously it can be polyvinyl chloride, polyamide, polymethyl methacrylate, polystyrene, polycarbonate, thermoplastic polyesters such as polyethylene terephthalate, polybutylene terephthalate, polycyclohexanedimethanol terephthalate, and polyolefins such as polyethylene, polypropylene, and any other polymer which can be improved by an impact modifier. The host polymer is advantageously polyvinyl chloride or polycarbonate.

The present invention also relates to the use of said hybrid impact modifiers in thermoplastic polymers.

The present invention also relates to a thermoplastic polymer containing said hybrid impact modifiers. This thermoplastic polymer containing the said hybrid impact modifiers can be used for cladding and for the manufacture of profiles, pipes, or siding.

The present invention also relates to an article having the thermoplastic composition as described above. This article can be a profile, a pipe or a siding.

The present invention also relates to hybrid modifiers having improved powder properties (flowability, lumping/caking resistance). The final product has to be considered as an hybrid impact modifier being either a composite modifier when the original mineral part consists in primary particles with sizes in the micrometer scale, or a nanocomposite modifier when the mineral part consists in primary particles with sizes in the nanometer scale. In fact, the resulting powder material consists in primary grains that contains both organic and inorganic phases, intimately mixed together.

The present invention has many advantages:

The hybrid modifier have improved impact performance compared to (i) the product resulting from the direct blend of the two original powders (organic modifier and inorganic filler), (ii) the organic modifier alone and (iii) the mineral filler alone. Therefore, there is a clear synergy effect between the organic and inorganic parts when the hybrid modifier is prepared as described in the present invention.

After introduction of such an hybrid impact modifier into a thermoplastic matrix followed by using conventional processing techniques (e.g.: extrusion, injection moulding) both phases of the hybrid impact modifier (organic and inorganic) are individually dispersed down to their own original primary particle size into the host thermoplastic matrix. However, thanks to the high compatibility of the organic impact modifier with the host thermoplastic matrix, the mineral filler is able to better disperse into this matrix than it usually does when introduced directly as a powder.

This new process for preparing an hybrid impact modifier can also be considered as a new way of introduction of a mineral filler into a plastic matrix through its intimate combination with an organic impact modifier, allowing to disperse standard mineral fillers that generally have specific surface treatments to bring the compatibility with the host plastic matrix but also mineral fillers without any surface treatment. In other words, the impact modifier may act as a compatibilizer for the mineral filler with respect to the host polymer matrix.

DETAILED DESCRIPTION OF THE INVENTION

As regards the standard impact modifiers, by way of examples mention may be made of ABS, MBS, AIM and CPE. Advantageously the impact modifier is in the form of fine primary particles having an elastomer core and at least one thermoplastic shell, the size of the primary particles being in general less than 1 micrometer and advantageously between 50 and 500 nanometers. The impact modifier is advantageously prepared by emulsion polymerization. The impact modifier content in the thermoplastic matrix is between 0 and 25%, preferably between 0 and 10%, by weight.

The impact modifier core may for example consist of:
  an isoprene or butadiene homopolymer; or
  isoprene copolymers with at most 30 mol % of a vinyl monomer; or
  butadiene copolymers with at most 30 mol % of a vinyl monomer.

The vinyl monomer may be styrene, an alkyl styrene, acrylonitrile or an alkyl(meth)acrylate The core may also consist of:
  an alkyl(meth)acrylate homopolymer; or
  copolymers of an alkyl(meth)acrylate with at most 30 mol % of a monomer chosen from another alkyl(meth)acrylate and a vinyl monomer.

The alkyl(meth)acrylate is advantageously butyl acrylate. The vinyl monomer may be styrene, an alkyl styrene, acrylonitrile, butadiene or isoprene.

Advantageously, the core may be completely or partly crosslinked. It is sufficient to add at least difunctional or trifunctional monomers during the preparation of the core. These monomers could be allyl methacrylate, diallylmaleate or may be chosen from poly(meth)acrylic esters of polyols, such as, butanediol diacrylate, butylene di(meth)-acrylate, trimethylolpropane trimethacrylate. Other difunctional monomers may for example be divinylbenzene, trivinylbenzene, vinyl acrylate and vinyl methacrylate. The core may also be crosslinked by introducing into it, by grafting or as comonomer during the polymerization, unsaturated functional monomers such as unsaturated carboxylic acid anhydrides, unsaturated carboxylic acids and unsaturated epoxides. As examples, mention may be made of maleic anhydride, (meth)acrylic acid and glycidyl methacrylate. The shell or shells are styrene, alkyl styrene, acrylonitrile or methyl methacrylate homopolymers or copolymers containing at least 70 mol % of one of these monomers mentioned above and at least one comonomer chosen from the other monomers mentioned above, another alkyl(meth)acrylate, vinyl acetate and acrylonitrile. The shell may be functionalized by introducing thereinto, by grafting or as comonomer during polymerization, unsaturated functional monomers such as unsaturated carboxylic acid anhydrides, unsaturated carboxylic acids and unsaturated epoxides or other functional monomer. As examples, mention may be made of maleic anhydride, (meth)acrylic acid and glycidyl methacrylate, hydroxyethyl(meth)acrylate.

As examples of impact modifiers, mention may be made of core-shell copolymers having a polystyrene homopolymer or copolymer shell and core-shell copolymers having a PMMA homopolymer or copolymer shell. There are also core-shell copolymers having two shells, one made of polystyrene and the other on the outside made of PMMA. Examples of impact modifiers and their method of preparation are described in the following patents: U.S. Pat. No. 4,180,494, U.S. Pat. No. 3,808,180, U.S. Pat. No. 4,096,202, U.S. Pat. No. 4,260,693, U.S. Pat. No. 3,287,443, U.S. Pat. No. 3,657,391, U.S. Pat. No. 4,299,928, U.S. Pat. No. 3,985,704 and U.S. Pat. No. 5,773,520.

Advantageously, the core represents 65 to 99.5% and the shell 35 to 0.5% by weight of the impact modifier, and preferably the core represents 85 to 98% and the shell 15 to 2% by weight of the impact modifier.

The impact modifier may be of the soft/hard type. As an example of an impact modifier of the soft/hard type, mention may be made of that consisting:
(i) of 75 to 80 parts of a core comprising at least 93 mol % of butadiene, 5 mol % of styrene and 0.5 to 1 mol % of divinylbenzene and
(ii) of 25 to 20 parts of two shells essentially of the same weight, the inner one made of polystyrene and the other outer one made of PMMA homopolymer or copolymer.

As another example of a soft/hard type impact modifier, mention may be made of that having a poly(butyl acrylate) or butyl acrylate/butadiene or poly(2-ethylhexylacrylate) or poly(2-ethylhexylacrylate)/butadiene crosslinked copolymer core (85 to 98 parts) and a PMMA homopolymer or copolymer shell (15 to 2 parts).

The impact modifier may also be of the hard/soft/hard type, that is to say it contains, in this order, a hard core, a soft shell and a hard shell. The hard parts may consist of the polymers of the shell of the above soft/hard copolymers and the soft part may consist of the polymers of the core of the above soft/hard copolymers.

Mention may be made, for example, of an impact modifier of the hard/soft/hard type consisting:
(i) of a core made of a methyl methacrylate/ethyl acrylate copolymer;
(ii) of a layer made of a butyl acrylate/styrene copolymer;
(iii) of a shell made of a methyl methacrylate/ethyl acrylate copolymer.

The impact modifier may also be of the hard (core)/soft/semi-hard type. In this case the "semi-hard" outer shell consists of two shells, one being the intermediate shell and the other the outer shell. The intermediate shell is a copolymer of methyl methacrylate, styrene and at least one monomer chosen from alkyl acrylates, butadiene and isoprene. The outer shell is a PMMA homopolymer or copolymer.

An example of a hard/soft/semi-hard impact modifier is that consisting, in this order:
(i) of a core made of a methyl methacrylate/ethyl acrylate copolymer;
(ii) of a shell made of a butyl acrylate/styrene copolymer;
(iii) of a shell made of a methyl methacrylate/butyl acrylate/styrene copolymer; and
(iv) of a shell made of a methyl methacrylate/ethyl acrylate copolymer.

As regards the mineral filler, it has, according to the invention, hardness on the Mohs scale less than 6 and for example less than or equal to 4. A mineral filler having hardness on the Mohs scale more than 6 leads to abrasion of the tools and machines used for the processing of the composition containing the impact modifier.

Particles of the mineral filler according to the invention have a diameter determined by any methods known by a person skilled in the art less than 1 μm.

Examples of mineral fillers according to the invention may include grinded natural calcium carbonate (GCC), precipitated calcium carbonate (PCC), nanosized PCC (NPCC), clay, Montmorillonite (nano-clay), zeolite, perlite or any other type of inorganic material that can be obtained as a slurry.

As regards the proportions of the standard impact modifiers and the mineral filler, advantageously the mineral filler is 0.1-95% (by weight) but preferably 1-50% and more especially 3-20% of the total amount of the standard impact modifiers and the mineral filler.

As regards the slurry of mineral filler, it is a water dispersion of a mineral filler with solid content advantageously between 5 and 80% but preferably between 25 and 60%. This water dispersion can contain any specific surfactant, dispersing agent, additive or filler surface treatment that can advantageously improve the quality of the slurry (stability, viscosity or compatibility with the host matrix).

The thermoplastic polymer containing said hybrid impact modifiers may also contain other additives such as additional mineral fillers, organic or inorganic pigments, carbon blacks, carbon nanotubes, glass beads, glass fibers, flame retardants and or reinforcing agents.

This thermoplastic polymer containing the said hybrid impact modifiers can be used for cladding and for the manufacture of profiles, pipes, or siding.

The present invention also relates to an article having the thermoplastic composition as described above. This article can be a profile, a pipe or a siding.

EXAMPLES

Example 1

Figure 1:
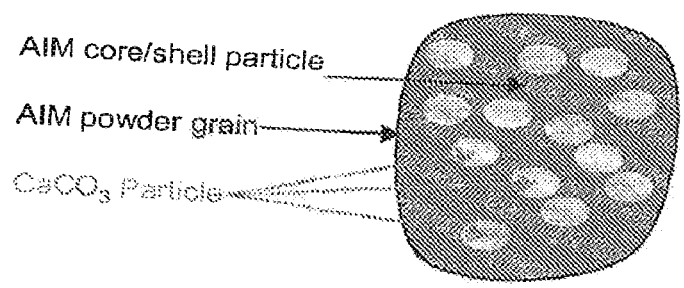
FIG. 1 is a conceptualization of an AIM hybrid particle.
Figure 2:
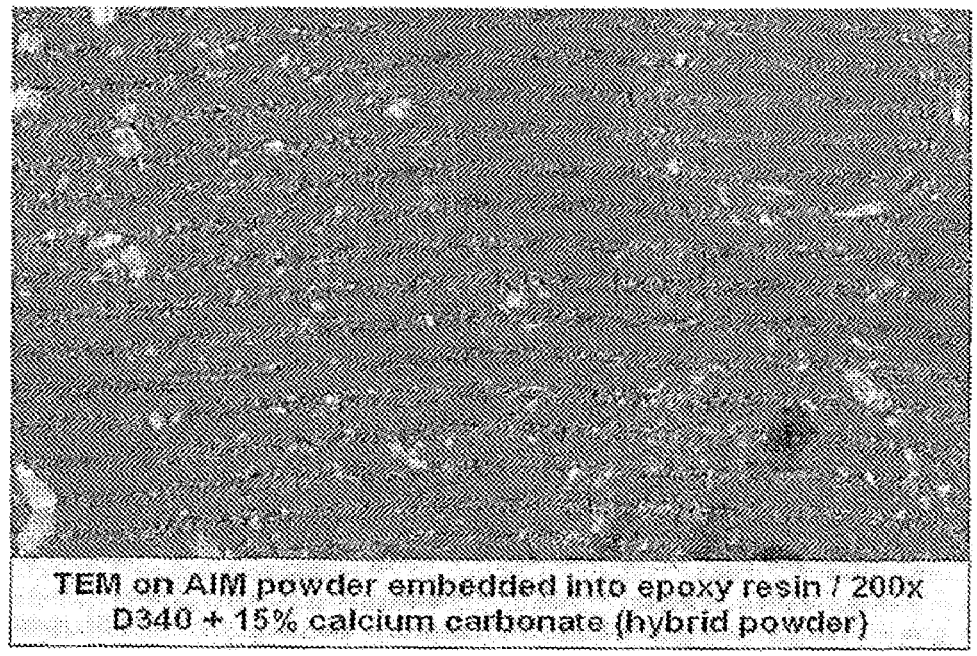
FIG. 2 is an SEM of TEM on AIM powder embedded into epoxy resin/200x.
Figure 3:
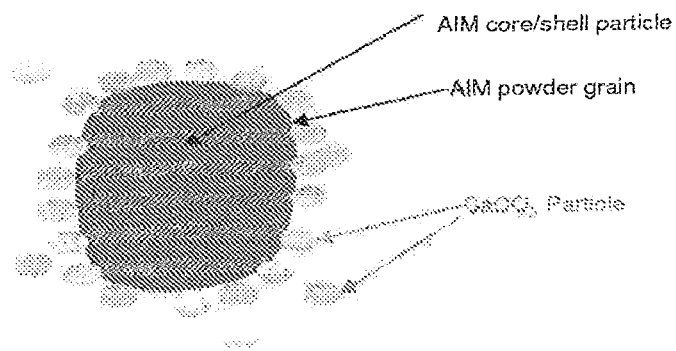
FIG. 3 is a conceptualization of an AIM hybrid particle mixture.
Figure 4:
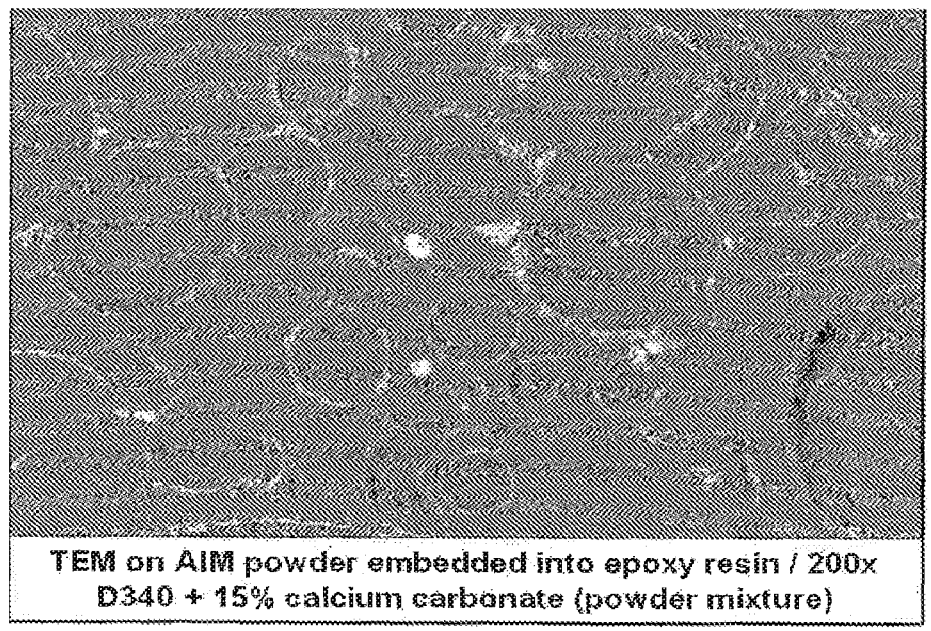
FIG. 4 is an SEM of TEM on AIM powder mixture embedded into epoxy resin/200x.

Preparation of a Hybrid Impact Modifier by Spray Drying

The impact modifier latex is prepared according to the technique described in U.S. Pat. No. 4,278,576, which employs a standard emulsion polymerization technique. Namely the core/shell acrylic polymer is prepared employing 84.2 parts of butyl acrylate, 0.4 parts of butylene glycol diacrylate and 0.4 parts of diallymaleate as elastomeric core, followed by a polymerization of 15 parts of methyl methacrylate. The solid content is 40%.

The $CaCO_3$ slurry is prepared according to the technique described in J.P. Pat. No. 59057913. Namely the slurry is obtained by mixing 270 parts of water, 0.72 parts of sodium polyacrylate and 729.3 parts of $CaCO_3$ of diam. 0.2-0.6 mu. and 0.6% moisture and stirring for 20 min at shear rate 5. times. 102/s.

The latex and the slurry are mixed for with the following ratio, 9.11 kg (9110 parts) of latex and 8.9 kg (8.9 parts) of slurry, and spray dried in the conditions classically used for the latex alone. The obtained powder as a particle size ~150 mu.

The hybrid impact modified is characterized by microscopy, homogeneity and segregation test.

Microscopy: the sample is observed by scanning electronic microscopy with retro diffusion mode in order to discriminate $CaCO_3$ and acrylic particles. $CaCO_3$ appears as a white phase and acrylic part as a grey phase. The $CaCO_3$ particles are seen inside the hybrid grain as small white spots (see drawing 1 and 2). The $CaCO_3$, in white in the picture due to retro diffusion, is located inside the AIM hybrid particle.

Homocieneity: $CaCO_3$ dosage by fluoX in done in 5 small samples of the hybrid impact modifier powder.

| Reference | $CaCO_3$ % | |
|---|---|---|
| | $1^{st}$ trial | $2^{nd}$ trial |
| Hybrid AIM/slurry sample 1 | 12.6 | 12.6 |
| Hybrid AIM/slurry sample 2 | 13.3 | 12.8 |
| Hybrid AIM/slurry sample 3 | 12.5 | 12.7 |
| Hybrid AIM/slurry sample 4 | 12.6 | 12.2 |
| Hybrid AIM/slurry sample 5 | 12.5 | 12.7 |
| Mean and dispersion | 12.6 ± 0.65 | |

We can observe a very low dispersion in the level of $CaCO_3$ of the sample.

Segregation test: The test consist of fluidization of the sample and checking if the $CaCO_3$ level is the same in the powder recovered at the top and the bottom of the fluidizer.

| Reference | $CaCO_3$ % | | |
|---|---|---|---|
| | $1^{st}$ trial | $2^{nd}$ trial | mean |
| Hybrid AIM/slurry, fine powder part after fluidization | 12.6 | 12;0 | 12.3 ± 0.3 |
| Hybrid AIM/slurry, big powder part after fluidization | 12.0 | 11.6 | 11.8 ± 0.2 |

The level of $CaCO_3$ in the fine and big powder particle is very similar, no segregation is observed Example 2 (comparative):

The impact modifier latex and the $CaCO_3$ slurry are the same as in example 1. But the spray drying of each suspension is done separately with the same conditions as in example 1. The obtained powders are mixed with an 85/15-acrylic/$CaCO_3$ ratio. The mixture is characterized in the same conditions as in example 1. Microscopy: the sample is observed by scanning electronic microscopy with retro diffusion mode in order to discriminate $CaCO_3$ and acrylic particles. $CaCO_3$ appears as a white phase and acrylic part as a grey phase. The $CaCO_3$ particles are around the acrylic grains (see comparative drawing 3 and 4).

Homogeneity: $CaCO_3$ dosage by fluoX in done in 5 small samples of the hybrid impact modifier powder.

| Reference | $CaCO_3$ % | |
|---|---|---|
| | $1^{st}$ trial | $2^{nd}$ trial |
| AIM + 15% $CaCO_3$ (powder mixture) sample 1 | 11.0 | 16.1 |
| AIM + 15% $CaCO_3$ (powder mixture) sample 2 | 14.0 | 15.3 |
| AIM + 15% $CaCO_3$ (powder mixture) sample 3 | 13.9 | 14.7 |
| AIM + 15% $CaCO_3$ (powder mixture) sample 4 | 14.0 | 14.1 |
| AIM + 15% $CaCO_3$ (powder mixture) sample 5 | 11.5 | 12.9 |
| Mean and dispersion | 13.7 ± 2.7 | |

The powder mixture (AIM+$CaCO_3$) is not homogeneous. A very high dispersion in the level of $CaCO_3$ is observed (4 time higher, deviation at 2.7 vs. 0.65 for the hybrid AIM/slurry).

Segregation test: The test consist of fluidization of the sample and checking if the $CaCO_3$ level is the same in the powder recovered at the top and the bottom of the fluidizer.

| Reference | $CaCO_3$ % | | |
|---|---|---|---|
| | $1^{st}$ trial | $2^{nd}$ trial | mean |
| D340 + 15% $CaCO_3$ (powder mixture) fine powder part after fluidization | 17.8 | 18.6 | 18.2 ± 0.4 |
| D340 15% $CaCO_3$ (powder mixture) big powder part after fluidization | 12.8 | 12.3 | 12.6 ± 0.3 |

During the segregation test, the level of $CaCO_3$ in the powder became lower than in the initial mixture for the big particle (12.6% vs. 14%) in higher in the fine particles part (18.2% vs. 14%). Even this not severe segregation test shows a significant segregation.

The invention claimed is:
1. Hybrid impact modifiers prepared by:
   (i) mixing a latex or slurry of standard impact modifiers comprising particles having an elastomeric core and at least one thermoplastic shell and a slurry of a mineral filler to form a homogeneous mixture, and
   recovering at least one hybrid impact modifier from the homogenous mixture by spray drying, coagulation, freeze coagulation, or other known recovery methods; or
   (ii) introducing a first stream comprising a latex or slurry of standard impact modifiers comprising particles having an elastomeric core and at least one thermoplastic shell and simultaneously introducing a second stream comprising a slurry of a mineral filler, and
   recovering at least one hybrid impact modifier from the combined first and second streams by spray drying, coagulation, or other known recovery methods,
   wherein the at least one hybrid impact modifier is recovered as a powder, the powder consists of grains comprising an intimately mixed organic phase and inorganic phase, and the inorganic phase comprises the mineral filler in the form of a plurality of particles inside the grains.
2. Hybrid impact modifiers according to claim 1 in which the mineral filler has hardness on the Mohs scale less than 6.
3. Hybrid impact modifiers according to claim 1 in which the mineral filler is grinded natural calcium carbonate (GCC), precipitated calcium carbonate (PCC), nanosized PCC(N-

PCC), clay, montmorillonite (nano-clay), zeolite, perlite or any other inorganic material that can be obtained as a slurry.

4. Hybrid impact modifiers according to claim 1 in which the proportions of the mineral filler is 0.1-95% by weight of the total amount of the standard impact modifiers and the mineral filler.

5. Hybrid impact modifiers according to claim 1 in which the proportions of the mineral filler is 1-50% by weight of the total amount of the standard impact modifiers and the mineral filler.

6. Hybrid impact modifiers according to claim 1 in which the proportions of the mineral filler is 3-20% by weight of the total amount of the standard impact modifiers and the mineral filler.

7. Hybrid impact modifiers according to claim 1 in which standard impact modifiers are chosen among methacrylate-butadiene-styrene copolymers (MBS), acrylonitrile-butadiene-styrene copolymers (ABS), acrylic core/shell polymers (AIM) and CPE (chlorinated polyethylene).

8. A thermoplastic polymer containing hybrid impact modifiers according to claim 1.

9. A thermoplastic polymer according to claim 8 which is polyvinyl chloride, polyamide, polymethyl methacrylate, polystyrene, polycarbonate, thermoplastic polyesters or polyolefins.

10. A thermoplastic polymer according to claim 8 which is polyvinyl chloride or polycarbonate.

11. A thermoplastic polymer according to claim 8, further comprising one or more additives selected from the group consisting of additional mineral fillers, organic or inorganic pigments, carbon blacks, carbon nanotubes, glass beads, glass fibers, flame retardants, reinforcing agents, and mixtures thereof.

12. An article comprising the thermoplastic polymer containing hybrid impact modifiers according to claim 9, wherein said article is a pipe or a profile or a siding.

13. Hybrid impact modifiers according to claim 1 in which the mineral filler has hardness on the Mohs scale less than or equal to 4.

14. A thermoplastic polymer according to claim 8 which is polyethylene terephthalate, polybutylene terephthalate, polycyclohexanedimethanol terephthalate, polyethylene or polypropylene.

15. Hybrid impact modifiers according to claim 1, further comprising filtrating and drying the hybrid impact modifiers to form the powder.

16. A hybrid impact modifier comprising a powder having at least one standard impact modifier intimately mixed with at least one mineral filler and the at least one mineral filler is in the form of a plurality of particles inside the hybrid impact modifier, the hybrid impact modifier obtained by:
  (i) mixing a latex or slurry of the at least one standard impact modifier comprising an elastomeric core and at least one thermoplastic shell and a slurry of the at least one mineral filler in water to form a homogeneous mixture, and
  recovering the hybrid impact modifier from the mixture; or
  (ii) introducing a first stream comprising a water-based latex or slurry of the at least one standard impact modifier comprising an elastomeric core and at least one thermoplastic shell and simultaneously introducing a second stream comprising a slurry of the at least one mineral filler and water, and
  recovering the hybrid impact modifier from the first and second streams.

17. A hybrid impact modifier according to claim 16, wherein the hybrid impact modifier is a composite or nano-composite modifier.

18. A hybrid impact modifier comprising at least one standard impact modifier comprising an elastomeric core and at least one thermoplastic shell and at least one mineral filler,
  wherein the at least one mineral filler is 0.1 to 95% by weight of the total amount of the standard impact modifier and the mineral filler; and
  wherein the hybrid impact modifier is in the form of a powder such that the at least one standard impact modifier is intimately mixed with the at least one mineral filler and the at least one mineral filler is in the form of a plurality of particles inside the hybrid impact modifier.

* * * * *